(12) United States Patent
Yen et al.

(10) Patent No.: US 7,321,599 B1
(45) Date of Patent: Jan. 22, 2008

(54) WIRED PROTOCOL TO WIRELESS PROTOCOL CONVERTER

(75) Inventors: Erich Yen, Fremont, CA (US); Thomas Lo, Cupertino, CA (US)

(73) Assignee: OTC Wireless, Inc., Fremont, CA (US)

( * ) Notice: Subject to any disclaimer, the term of this patent is extended or adjusted under 35 U.S.C. 154(b) by 1012 days.

(21) Appl. No.: 10/209,118

(22) Filed: Jul. 30, 2002

(51) Int. Cl.
*H04J 3/16* (2006.01)

(52) U.S. Cl. .................. 370/466; 455/553.1; 709/230

(58) Field of Classification Search ............ 450/553.1; 370/392; 709/225, 229, 230, 231
See application file for complete search history.

(56) References Cited

U.S. PATENT DOCUMENTS

| | | | | |
|---|---|---|---|---|
| 5,566,170 A | * | 10/1996 | Bakke et al. ............... | 370/392 |
| 7,024,222 B2 | * | 4/2006 | Gorsuch ................... | 455/553.1 |
| 7,024,478 B1 | * | 4/2006 | Dalgic et al. ............... | 709/225 |
| 2001/0023446 A1 | * | 9/2001 | Balogh ..................... | 709/229 |
| 2004/0059825 A1 | * | 3/2004 | Edwards et al. ............ | 709/230 |
| 2006/0031550 A1 | * | 2/2006 | Janik et al. ................. | 709/231 |

* cited by examiner

*Primary Examiner*—Chi Pham
*Assistant Examiner*—Albert T. Chou
(74) *Attorney, Agent, or Firm*—Sonnenschein Nath & Rosenthal LLP (57) ABSTRACT

Apparati, methods, and computer readable media for facilitating the quick and inexpensive conversion of a wired computer network into a wireless computer network. The resulting wireless network comprises at least two portable computers (21) adapted to communicate with each other via radio. At least one of said portable computers (21) comprises a wired protocol module (26) enabling the portable computer (21) to communicate using a wired protocol; a wireless adapter (36) for converting the wired protocol to a wireless protocol; and an antenna (17) coupled to the wireless adapter (36).

1 Claim, 9 Drawing Sheets

WIRED PROTOCOL TO WIRELESS PROTOCOL CONVERTER

TECHNICAL FIELD

This invention pertains to the field of converting portable computers that are configured to network using a wired protocol, so that said computers will network using a wireless protocol, such as IEEE 802.11b.

BACKGROUND ART

Figure 1:
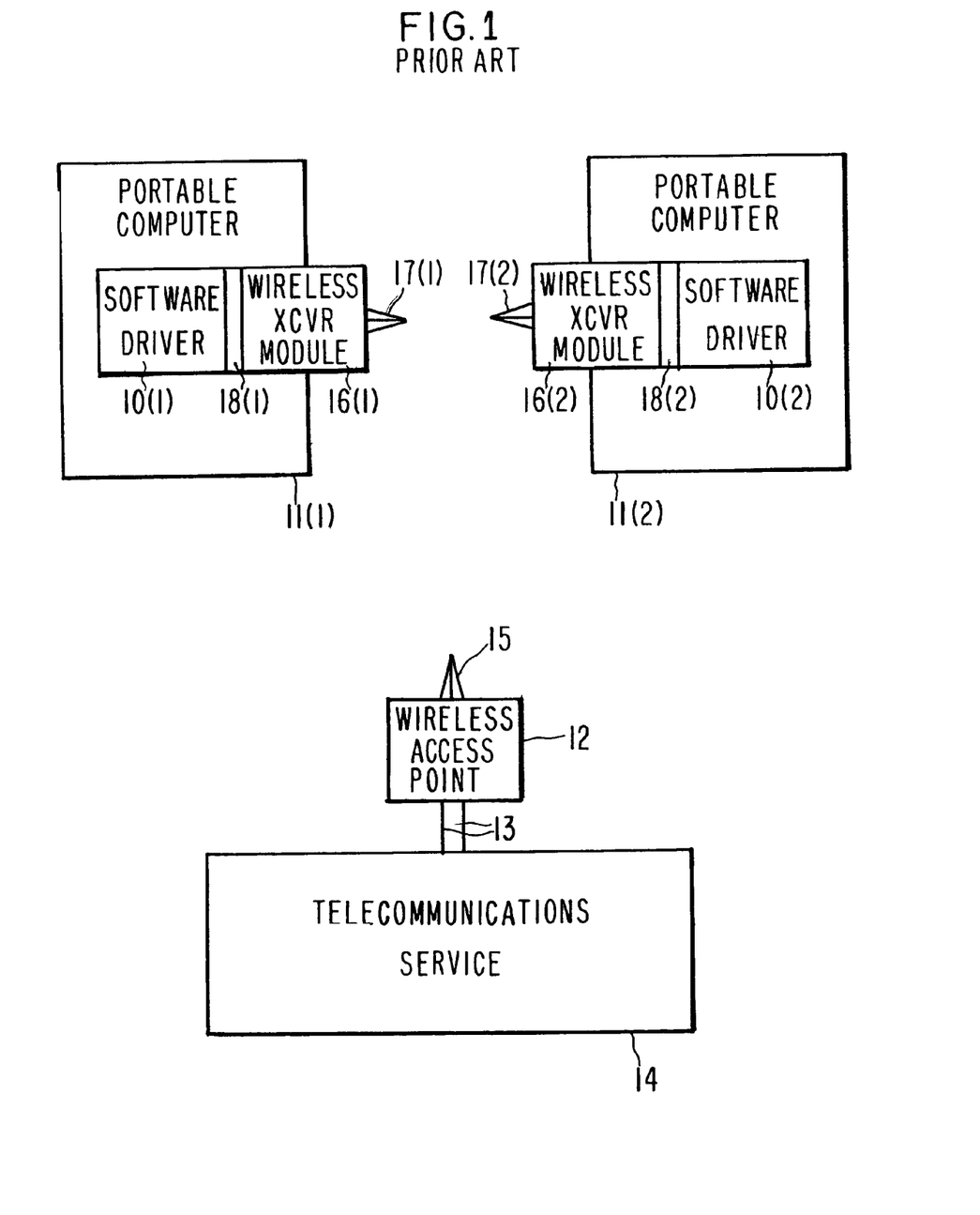
FIG. 1 is a block diagram of a wireless protocol network of the prior art.

Wireless networks of portable computers using protocols such as IEEE 802.11b promulgated by the Institute of Electrical and Electronics Engineers are becoming increasingly popular. FIG. 1 illustrates such a system, in which a plurality of portable computers 11 (two are illustrated) communicate with each other and with a geographically fixed wireless access point 12. Such a configuration can be used in an office building, in a neighborhood, or on a cruise ship.

Each computer 11 is fitted with a wireless transceiver module 16, which may be, for example, in the form of a PCMCIA card that attaches to computer 11 by means of a PCMCIA connector 18. Each module 16 contains a transmitter and receiver that are coupled to an antenna 17. Wireless access point 12 is likewise fitted with an antenna 15, and may be coupled to a telecommunications service 14, such as the Internet or the public switched telephone network (PSTN) via a link 13. Link 13 may be a wired link, such as an Ethernet link, or a wireless link, such as a satellite link, a terrestrial microwave link, etc. Each computer 11 requires a software driver 10 for wireless transceiver module 16. The software driver 10 is different for every different operating system.

In the 802.11b standard, the frequency of use is around 2.4 GHz. In a typical 802.11b configuration, there can be up to 64 computers 11 in communication with each other and with wireless access point 12. The computers 11 are limited in power to about a quarter of a watt and are situated within a 350 ft. radius.

Figure 2:
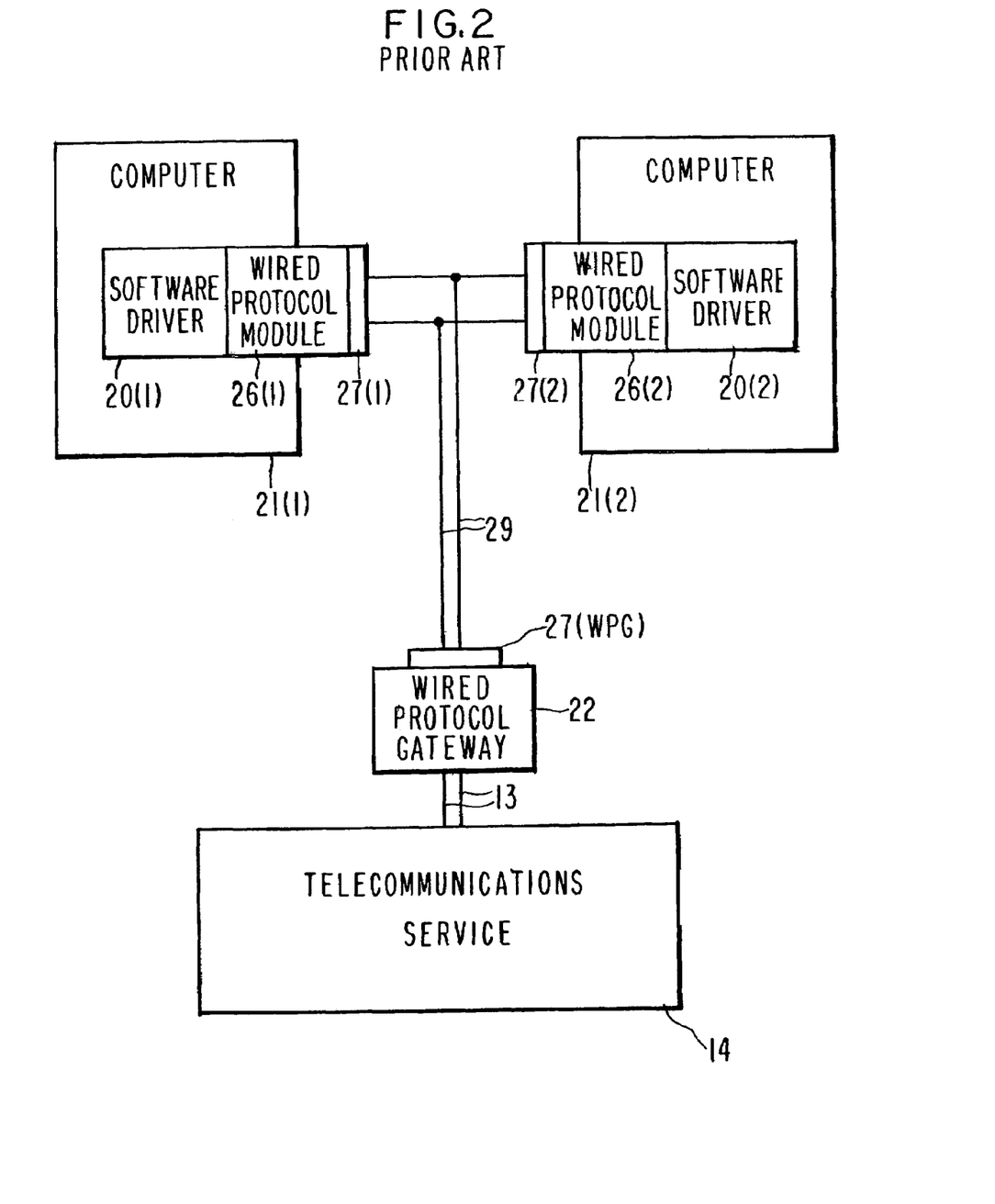
FIG. 2 is a block diagram of a wired protocol network of the prior art.

Wired local area networks are also popular. Such a network is illustrated in FIG. 2, which features a plurality of portable computers 21 (two are illustrated) in wired communication with each other and with geographically fixed wired protocol gateway 22. The wired protocol may be the popular Ethernet. As with wireless access point 12 of FIG. 1, wired protocol gateway 22 can communicate with telecommunications service 14 over link 13. Each computer 21 is fitted with a wired protocol module 26, e.g., an Ethernet chip or card. The communications take place over wires (cables) 29, which are coupled to computers 21 and to wired protocol gateway 22 via connectors 27. In the case of the Ethernet, connector 27 is an 8 pin connector known as an RJ45 connector. Similar to the wireless protocol configuration illustrated in FIG. 1, each computer 21 requires a software driver 20 in order to operate its wired protocol module 26. Again, a different driver 20 is required for every operating system that may be employed on computer 21.

As more and more computer users wish to be free of the wires 29 that bind them, there is an increasingly felt need for a simple and inexpensive means to convert the wired protocol network of FIG. 2 to a wireless network such as illustrated in FIG. 1. The present invention meets that need.

DISCLOSURE OF INVENTION

Apparati, methods, and computer readable media for facilitating the quick and inexpensive conversion of a wired computer network into a wireless computer network. The resulting wireless network comprises at least two portable computers (21) adapted to communicate with each other via radio. At least one of said portable computers (21) comprises a wired protocol module (26) enabling the portable computer (21) to communicate using a wired protocol; a wireless adapter (36) for converting the wired protocol to a wireless protocol; and an antenna (17) coupled to the wireless adapter (36).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 3:
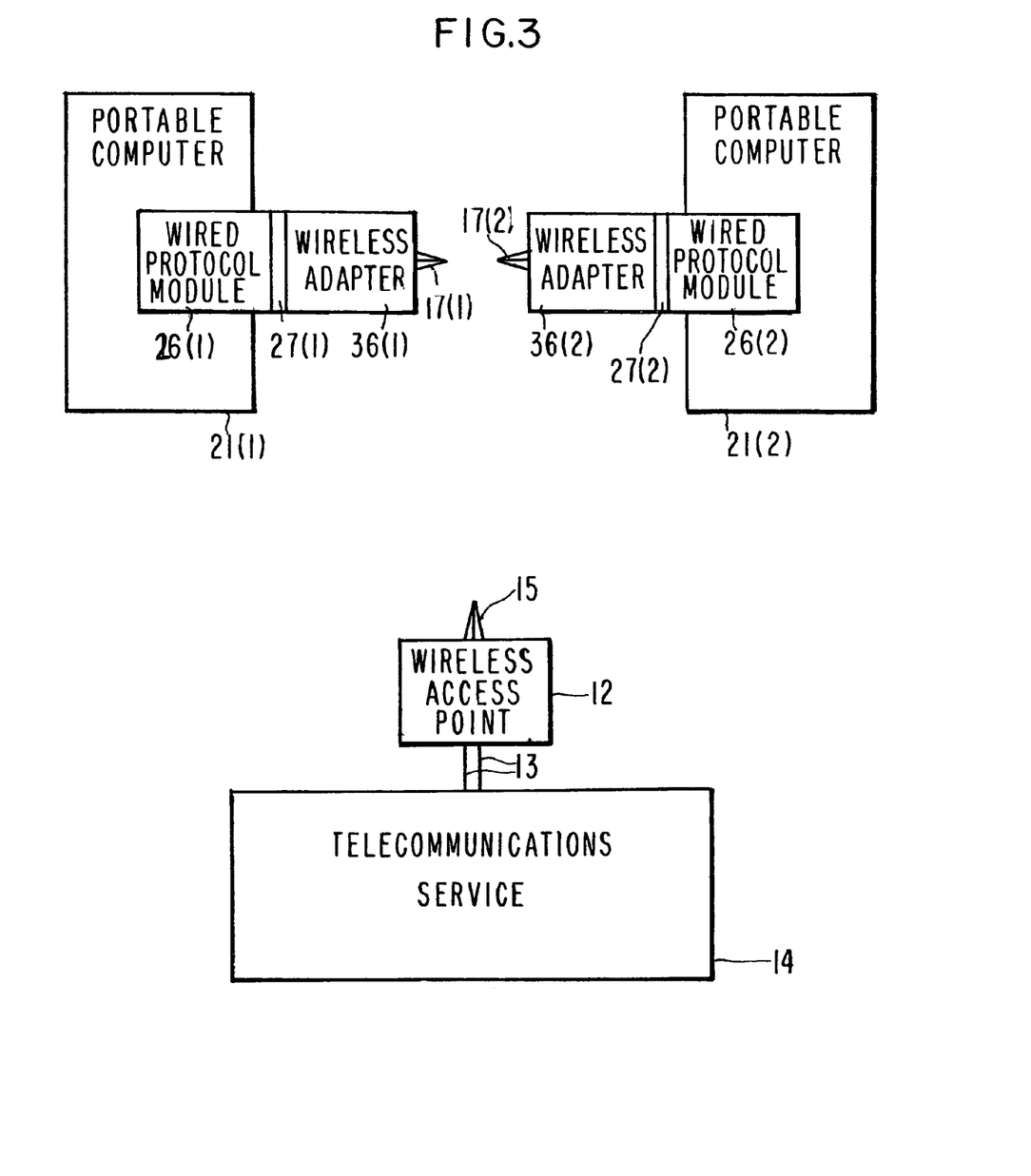
FIG. 3 is a block diagram of a preferred embodiment of the present invention.

FIG. 3 illustrates a wireless network incorporating the present invention. A plurality of portable computers 21 (two are illustrated) communicate with each other and with geographically fixed wireless access point 12 via radio. Computers 21 are like those illustrated in FIG. 2, i.e., they are each fitted with a wired protocol module 26 in the form of a card or a chip, and with a software driver 20 associated therewith. Each computer 21 further comprises a wireless adapter 36 that converts the wired protocol to a wireless protocol, and vice versa. It can be readily seen from FIG. 3 that wireless adapter 36, by simply fitting onto an existing computer 21, is able to convert computer 21 from one operable in a wired network into one operable in a wireless network.

In a preferred embodiment illustrated herein, the wired protocol is the Ethernet protocol and the wireless protocol is the IEEE 802.11b protocol. Other wireless protocols for which the present invention has applicability include, but are not limited to, 802.11a, 802.11g, HyperLAN, and HyperLAN/2. A connector 27 couples wired protocol module 26 to wireless adapter 36. In the case where the wired protocol is the Ethernet protocol, connector 27 is an 8 pin connector known as an RJ45 connector. Each wireless adapter 36 includes an antenna 17 to facilitate radio communications.

A fixed wireless access point 12 may be part of the network, as in FIG. 1. Wireless access point 12 includes an antenna 15 to facilitate radio communication with computers 21. Wireless access point 12 may be coupled to a telecommunications service 14 such as the Internet or the public switched telephone network (PSTN) via a link 13. Link 13 may be a wired link, such as an Ethernet link, or a wireless link, such as a satellite link or a terrestrial microwave link.

FIG. 3 illustrates two wireless adapters 36 of the present invention communicating with each other. However, one or more of the computers 21 in the network could be fitted with a conventional wireless transceiver module 16 of the prior art.

Figure 4:
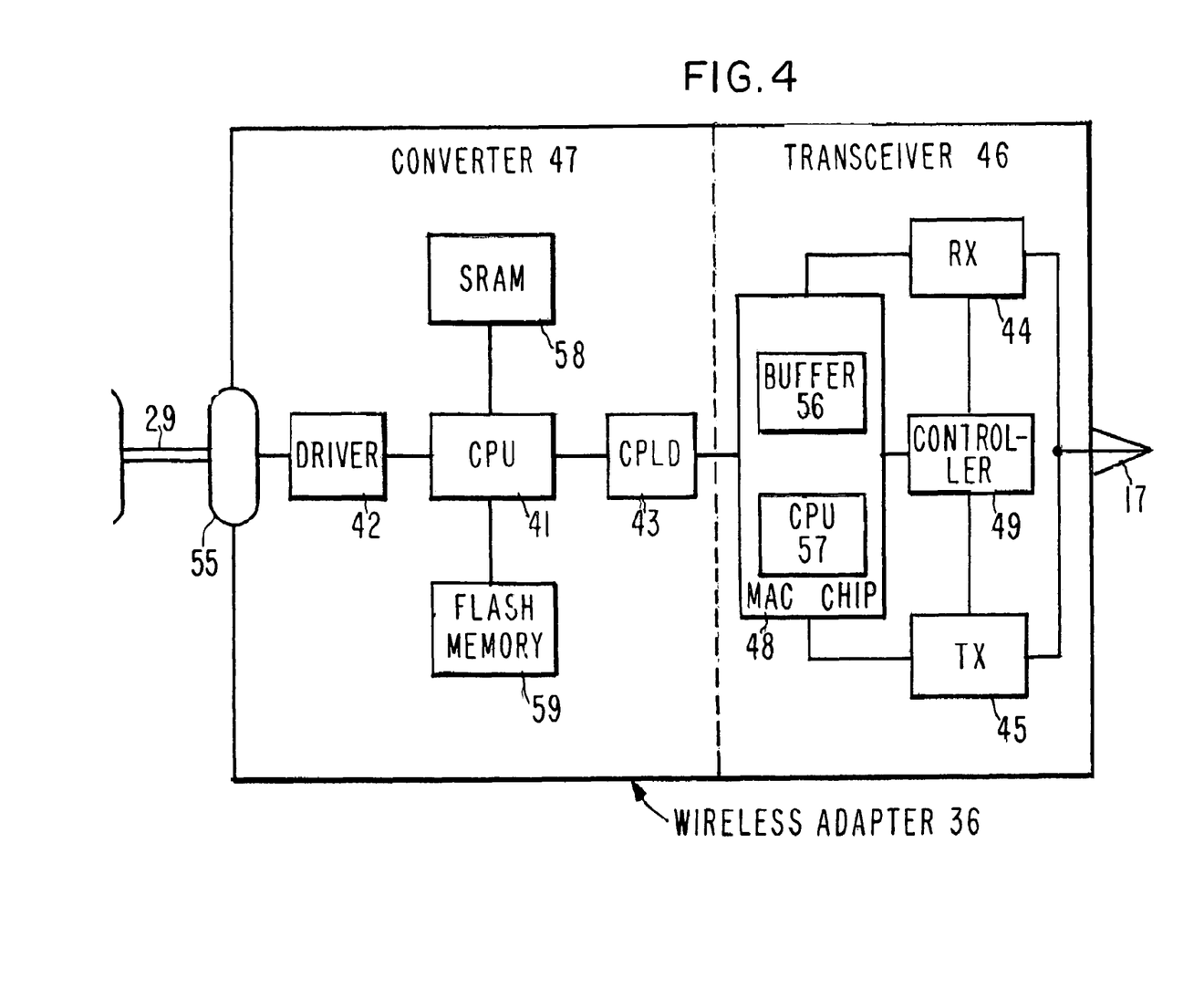
FIG. 4 is a block diagram of wireless adapter 36 of the present invention.

FIG. 4 illustrates the component parts of wireless adapter 36, which has two main sections, a transceiver section and a converter section 47. Transceiver 46 comprises a receiver 44 and a transmitter 45, each of which is coupled to antenna 17, e.g., via a switch or relay (not illustrated). Advantageously, transceiver 46 can be wireless transceiver module 16 of the prior art, such as a conventional PCMCIA transceiver card, with its connector 18 stripped off. Transmitter 45 comprises a modulator for modulating digital signal information presented to its input terminal onto an analog radio frequency carrier; the combined signal is sent to antenna 17. Conversely, receiver 44 comprises a demodulator for demodulating analog signals presented to its input terminal and for outputting a digital baseband signal containing information that is presented to converter 47.

Transceiver 46 also comprises a MAC (Media Access Control) chip 48 that is coupled to receiver 44, to transmitter 45, and to CPLD 43 of converter 47; and a radio controller (microprocessor) 49 that is coupled to MAC chip 48, to receiver 44, and to transmitter 45. MAC chip 48 comprises its own CPU 57 and a buffer 56. A MAC chip is present on every device 16 in an 80211.b networks. It serves to authenticate the wireless devices 16 to wireless access point 12, and to facilitate handoffs from one device 16 to another when the devices 16 move into and out of range of each other. Media Access Control operates at the data link layer, one layer above the physical layer in a standard OSI network, and can also incorporate security functions.

Preferably, converter 47 comprises a logic chip such as a programmable gate array or the illustrated CPLD (Complex Programmable Logic Device) 43, and a microprocessor (CPU) 41. CPLD 43 is coupled to MAC chip 48 and to CPU 41. CPU 41 is coupled to CPLD 43 and to output connector 55. Connector 55 can be coupled directly to wired protocol connector 27, or, alternatively, coupled indirectly to connector 27 via wired protocol cable 29. One scenario in which cable 29 is employed is where it is desirable to place antenna 17 at a location remote from that of portable computer 21. For example, in a crowded office building, it may be desirable to place antenna 17 on the roof of the building, where other similar antennas 17 for other portable computers 21 are situated. This is because on the roof, there is nothing in between the antennas 17 except for air. If the antennas 17 were within the office building, on the other hand, radio signals emanating from said antennas 17 would have to traverse many physical obstacles, thereby becoming undesirably attenuated. If an antenna 17 is on the roof, it follows that its associated transceiver 46 must also be on the roof, since at the microwave frequencies at which wireless protocols typically operate, much attenuation would ensue if a transmission line were needed to couple antenna 17 to transceiver 46. Hence, the need for cable 29 to couple wireless adapter 36 with computer 21, which is collocated with the user within the office building.

CPU 41 preferably has associated therewith random access memory, such as SRAM 58, flash (non-volatile) memory 59, and driver module 42, which may reside on any computer-readable medium and may be implemented in hardware, software, and/or firmware. Driver 42 is typically implemented in firmware. Unlike flash memory 59, SRAM (Static Random Access Memory) 58 loses its memory when the power is shut off; on the other hand, SRAM 58 is faster than flash memory 59.

Figure 9:
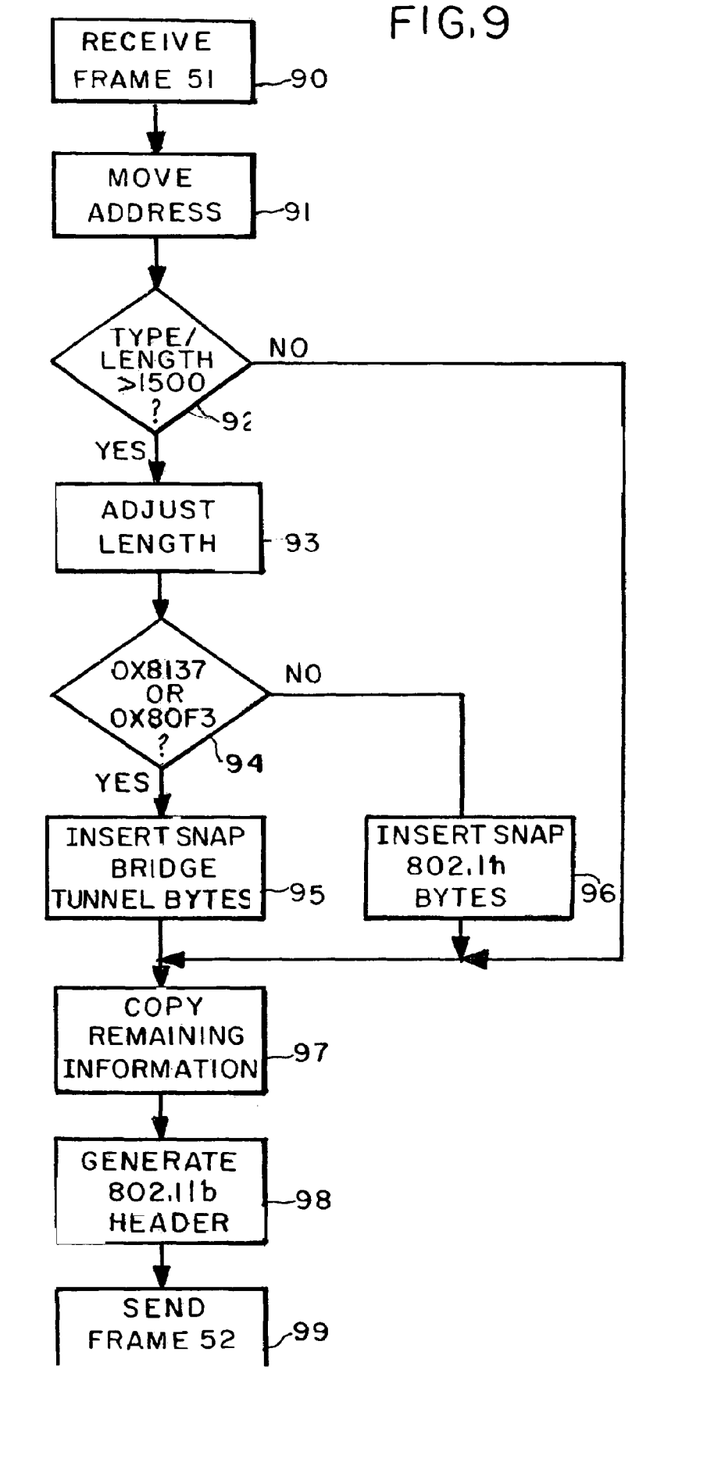
FIG. 9 is a flow diagram illustrating how module 72 converts from an Ethernet frame 51 to an 802.11b frame 52.
Figure 10:
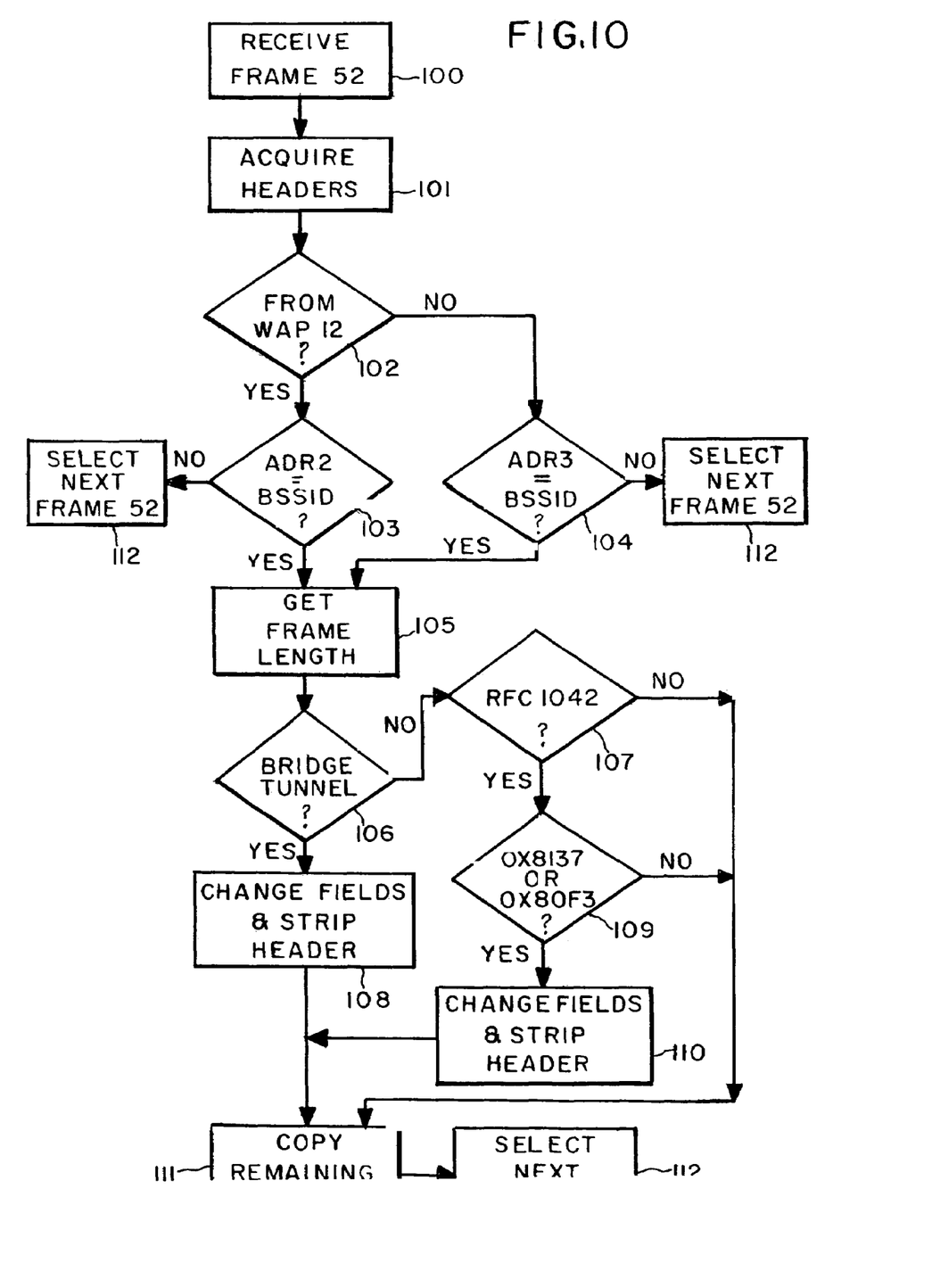
FIG. 10 is a flow diagram illustrating how module 71 converts from an 802.11b frame 52 to an Ethernet frame 51.

Driver 42 performs several important tasks:
1) Driver 42 emulates the software drivers 10,20 of the prior art. Driver 42 is an abbreviated version of these large and cumbersome software drivers 10,20 that are typically found in personal computers 21, e.g., those operating under a Windows operating system.
2) Driver 42 converts frames (packets) from the wired protocol format to the wireless protocol format, and vice versa. Exemplary methods for conversion are shown in FIGS. 9 and 10, where the wired protocol is the Ethernet protocol and the wireless protocol is the 802.11b protocol.
3) Driver 42 synchronizes the speed of CPU 41 and the speed of the CPU within computer 21. For the popular 802.11b wireless protocol, the speed of CPU 41 may be a relatively slow 22 MHz, whereas the speed of computer 21 may be 1 GHz using popularly available technology at the time this patent application was written.
4) Driver 42 has stored therein the MAC (Media Access Control) address of the wired protocol module 26, and converts the MAC address of transceiver 46 to that of the wired protocol module 26. This allows wireless adapter 36 to function in a wireless network.

CPLD 43 performs two functions. First, CPLD 43 converts the timing from CPU 41 to the timing used by transceiver 46. This can be very convenient, because it gives flexibility in the type of transceiver 46 and the type of CPU 41 that can be employed. For example, transceiver 46 can be any wireless transceiver module 16 of a conventional wireless network with its connector 18 removed. The second function of CPLD 43 is to decode addresses. The functions of CPLD 43 will be described more fully below in conjunction with the description of FIG. 6.

CPU 41 can be a conventional general purpose microprocessor. For the case where the 802.11b protocol is employed, a CPU 41 speed of 22 MHz is adequate. Such microprocessors 41 can now be obtained readily and cheaply.

Figures 5, 5A, 5B:
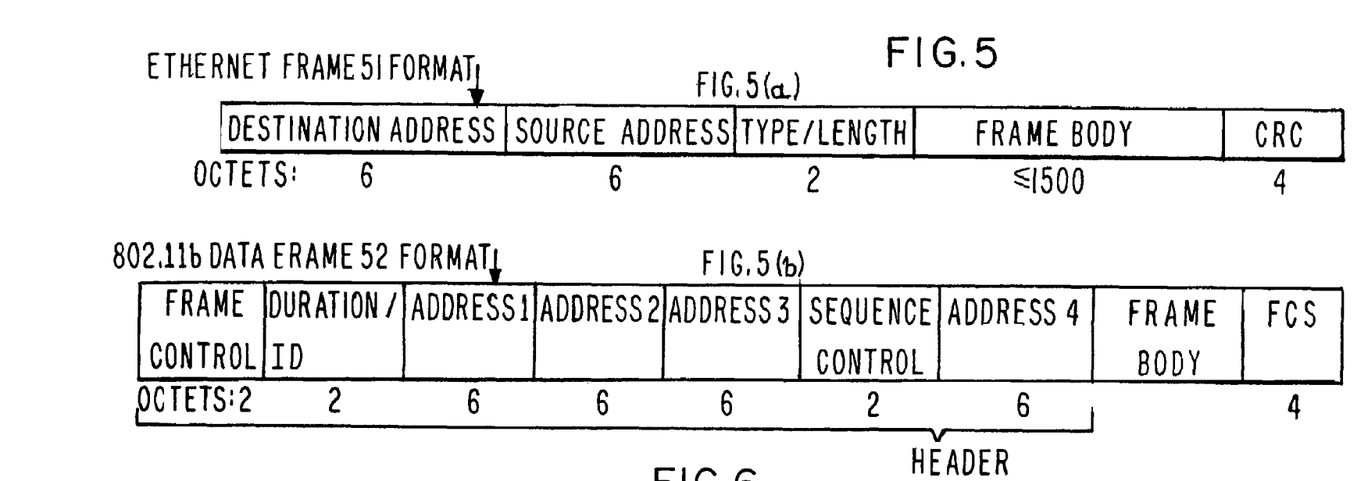
FIG. 5 is a frame diagram showing an exemplary frame for each of two popular digital communications protocols.

FIG. 5 shows that an Ethernet frame 51 typically comprises a 6 byte destination address field, a 6 byte source address field, a 2 byte field that can represent either type or length (depending upon the type of the Ethernet frame 51), a data field (frame body) having a maximum length of 1.5 KB, and a CRC (Cyclic Redundancy Check) field of 4 bytes. When the type/length field represents length, it represents the length of the frame body. When the type/length field represents type, it indicates protocol implementation details.

An 802.11b frame 52 typically comprises a 2 byte frame control field, a 2 byte duration/ID field, a 6 byte field giving address1, a 6 byte field giving address2, a 6 byte field giving address3, a 2 byte sequence control field, a 6 byte field giving address4, a frame body, and a 4 byte FCS (Frame Check Sum) field. The set of all fields except for the last two fields constitutes the 802.11b header. If frame 52 is a control frame, the duration/ID field gives the frame ID; otherwise, this field gives the time duration of the frame 52. The address fields can indicate source address or destination address, depending on the type of frame 52. The sequence control field gives a sequence number of the frame 52. This facilitates keeping the sequences in the correct order in case one or more of the frames 52 is delayed, e.g., due to the need to retransmit the frame 52 where the receiver doesn't initially acknowledge it. The Frame Check Sum is a type of error correction.

Figure 6:
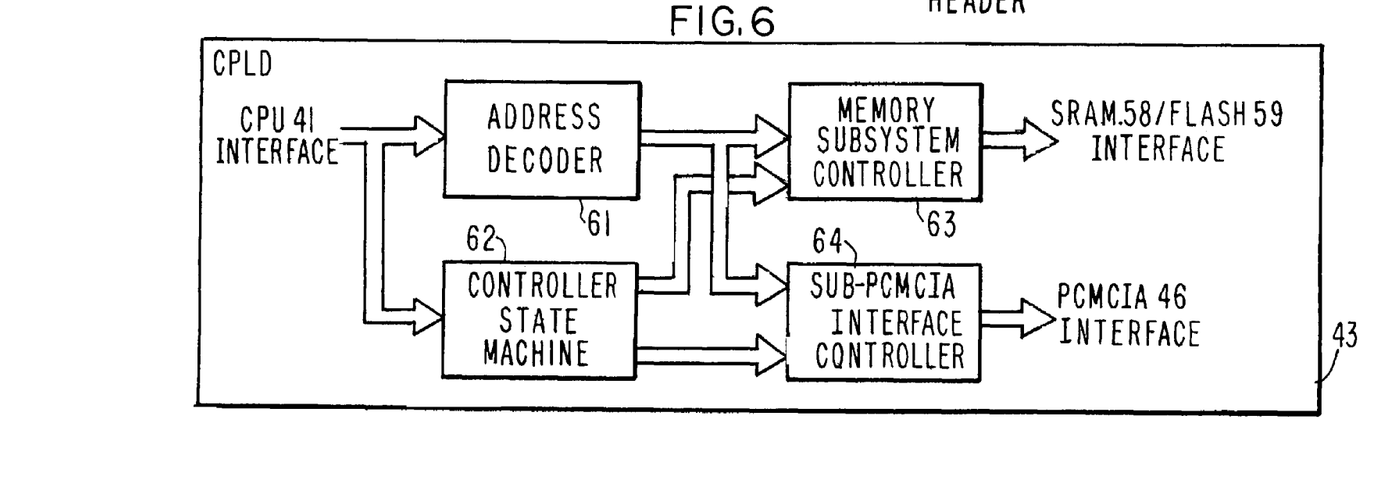
FIG. 6 is a block diagram illustrating CPLD 43.

FIG. 6 shows that CPLD 43 has four major building blocks, interconnected as shown.

Address decoder 61 decodes signals received from CPU 41 and routes these signals either to memory subsystem controller 63 or to sub-PCMCIA interface controller 64, based upon the address in the frame 51,52.

Controller state machine 62 performs a handshaking function, determining that both CPU 41 and transceiver 46 are ready to communicate with each other.

Memory subsystem controller 63 formats and combines signals received from address decoder 61 that are destined to SRAM 58 and to flash memory 59. Controller 63 also synchronizes the timing between CPU 41 and memories 58,59.

Sub-PCMCIA controller 64 combines the signals emanating from CPU 41 together in a way that conforms with the PCMCIA or other specification governing transceiver 46. "Sub-PCMCIA" means that not all of the PCMCIA functions are implemented. This is an advantage of the present invention, because it reduces cost and complexity. Controller 64 also synchronizes the timing between CPU 41 and transceiver 46. Examples of signals that might be sent from CPU 41 to transceiver 46 include the state of the selected radio channel frequency, a command to said channel, and a command to set the BSSID (Basic Service Set Identification).

Figure 7:
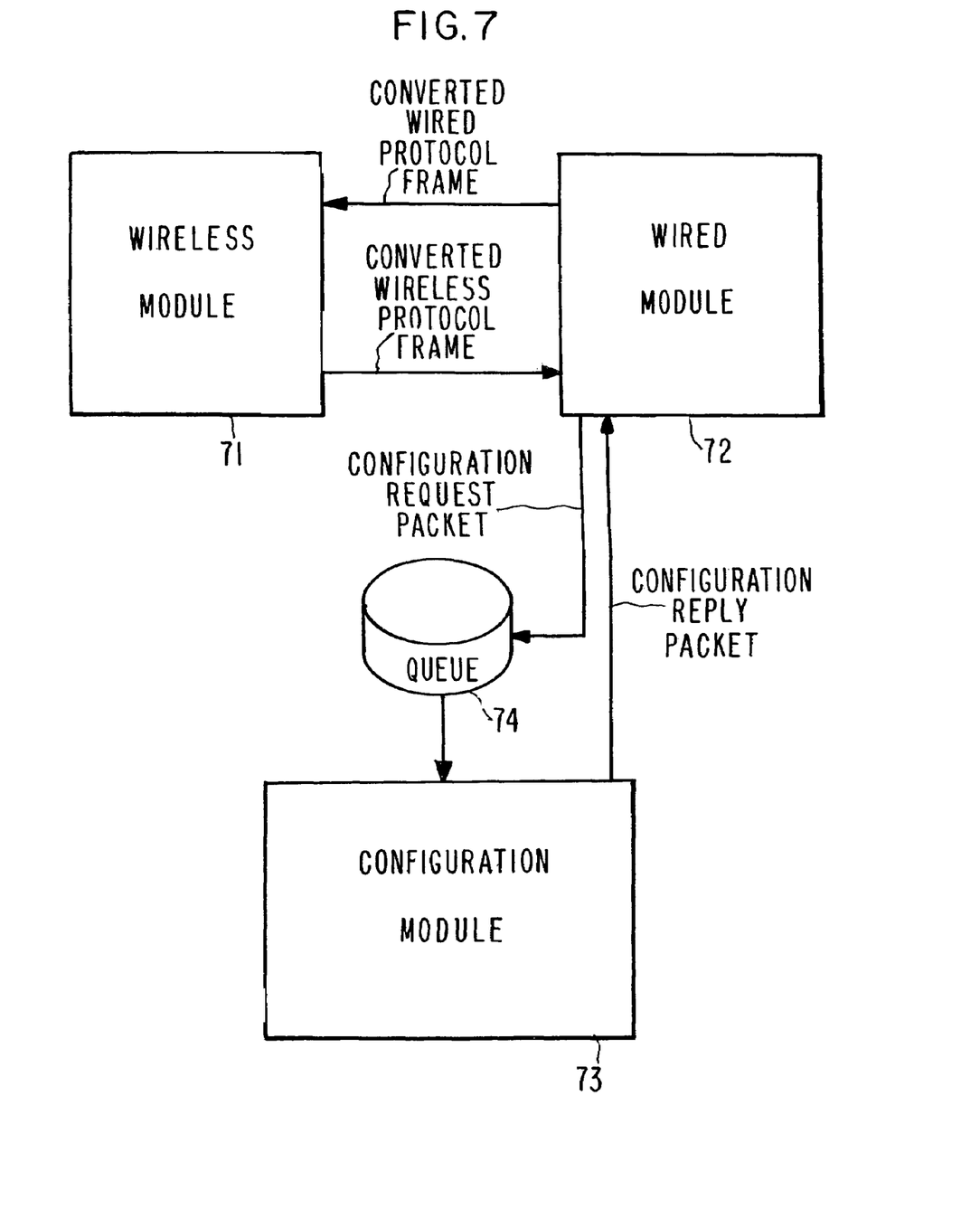
FIG. 7 is a block diagram of driver 42.

FIG. 7 shows that the main building blocks within driver 42 are wireless module 71, wired module 72, configuration module 73, and queue 74, interconnected as shown. Wireless module 71 serves as a driver for transceiver 46. Module 71 reacts to Interrupt Service Routines (ISR's) to handle and process data frames, management frames, and control signals emanating from transceiver 46. Management frames are 802.11b frames 52 used between two 802.11b devices 16 to enable the devices 16 to negotiate links to each other. Wireless module 71 responds to MAC frames 52. Finally, wireless module 71 converts data frames that are in the wireless protocol format into data frames 51 that are in the wired protocol format. In the case where the wired protocol is the Ethernet protocol, these wired protocol frames 52 are placed into an Ethernet NIC (Network Interface Controller) buffer within Ethernet chip 26.

Wired module (driver) 72 reacts to ISR's to handle and process wired protocol frames 51. Module 72 contains a transmit routine for enabling wireless module 71 and configuration module 73 to transmit data through the wired port 55. Module 72 checks to see whether a given frame is a configuration frame. If not, it is assumed that it is a data frame 51 in the wired format, in which case module 72 converts the frame 51 into a wireless frame 52 and sends it to transmission buffer 56 within MAC chip 48. The data (communications traffic) is then transmitted by transmitter 45. If, on the other hand, a given frame is a configuration frame, module 72 sends the frame to queue (buffer) 74. A dispatcher program grabs the frame from queue 74 and sends it to configuration module 73.

Configuration module 73 contains routines to process configuration frames, which are typically UDP/IP (User Datagram Protocol/Internet Protocol) packets. Such packets usually emanate from wired protocol module 26, and perform such functions as setup, or changing the BSSID. Such packets also include self-generated administrative data generated by CPU 41. Configuration module 73 also contains routines to save and restore configurations to and from flash memory 59; routines to compose and decode configuration format packets; and the aforesaid dispatcher program.

Figure 8:
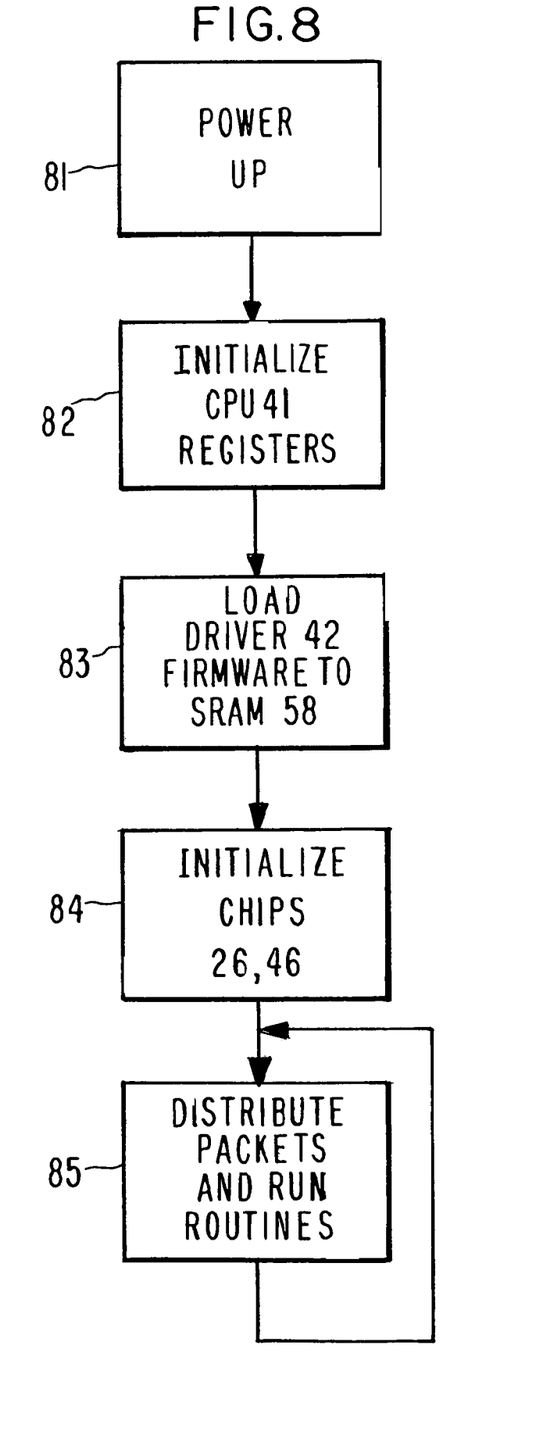
FIG. 8 is a flow diagram illustrating the overall operation of wireless adapter 36.

FIG. 8 illustrates the overall operation of converter 47. At step 81, hardware devices such as CPU 41, wired protocol module 26, and transceiver 46 are powered up. At step 82, CPU 41 initializes registers associated therewith. At step 83, a loader program within flash memory 59 loads the firmware modules from driver 42 into SRAM 58. CPU 41 then executes these modules out of SRAM 58, which has faster access than driver 42 and flash memory 59. At step 84, wired protocol module 26 is initialized using the manufacturer's specifications. Also at step 84, configuration information for transceiver 46 is extracted from flash memory 59 and used to initialize transceiver 46. Step 85 is the main processing loop. In step 85, the dispatcher program within configuration module 73 distributes packets (frames) among configuration module 73, wireless module 71, and wired protocol module 72; then routines (programs) within these modules 71-73 operate on the frames according to their type.

FIG. 9 illustrates the operation of wired module 72 in a preferred embodiment in which the wired protocol is the Ethernet protocol. At step 90, an Ethernet frame 51 is received at Ethernet port 55. At step 91, Ethernet module 72 sends the destination address and source address from frame 51 to MAC chip buffer 56 via CPLD 43. The destination address is the address of the computer 21 that the sender of the information wishes to communicate with. The source address is the address of computer 21 that is the source of the communications.

At step 92, Ethernet module 72 asks whether the type/length field of frame 51 is greater than 1500. If the answer is no, it is known that frame 51 is a data frame, and the method proceeds to step 97. If the answer is yes, it is known that frame 51 is a type frame, and the method proceeds to step 93.

At step 93, the value of the length field of frame 51 is set to the original frame 51 length minus 14 plus 8. The subtraction of 14 represents the subtraction of 6 destination bytes, 6 source bytes, and 2 type/length bytes. The addition of 8 represents the fact that the method illustrated in FIG. 9 is about to add new bytes. This new length is sent to MAC chip buffer 56, and the method proceeds to step 94.

At step 94, Ethernet module 72 asks whether the value in the type/length field of frame 51 is 0X8137 or 0X80F3. X is a marker indicating that the hexadecimal format is being used. If the answer to this question is yes, step 95 is entered into. If the answer is no, step 96 is entered into.

At step 95, Ethernet module 72 places 6 bytes of SNAP bridge tunnel format data into MAC chip buffer 56. At step 96, Ethernet module 72 places bytes of SNAP 802.1h format data into MAC chip buffer 56. SNAP is a format that is used by the 802.11b protocol.

After either step 95 or step 96 is executed, the method proceeds to step 97, where the remaining information from frame 51 is copied into MAC chip buffer 56.

At step 98, CPU 57 located within MAC chip 48 uses the information contained within MAC chip buffer 56 to generate the 802.11b header. At step 99, CPU 57 sends the now complete 802.11b frame 52 to transmitter 45. The 802.11b frame 52 consists of the header generated in step 98, the data received in buffer 56 in step 97, and the Frame Check Sum as illustrated in FIG. 5.

FIG. 10 illustrates the operation of wireless module 71 in a preferred embodiment in which the wireless protocol is the 802.11b protocol. At step 100, 802.11b module 71 receives an 802.11b frame 52 from receiver 44 via CPLD 43. At step 101, 802.11b module 71 identifies the 802.11b header of frame 52 and the SNAP header, if any. Some frames 52 have SNAP headers and some don't, depending upon the type of the frame 52. If a SNAP header is present, it appears within the frame body of frame 52.

At step 102, 802.11b module 71 asks whether frame 52 has emanated from wireless access point 12. This information is contained within the frame control field of frame 52. If the answer is yes, step 103 is executed. If the answer is no, step 104 is executed.

At step 103, 802.11b module 71 asks whether address2 of frame 52 has a value equal to the current BSSID within SRAM 58. If the answer is yes, the method proceeds to step 105. If the answer is no, it means that wireless adapter 36 is not authorized to communicate with the sender of the frame 52, and the method reverts to step 112, where the current frame 52 is discarded and a new frame 52 is examined.

At step 104, 802.11b module 71 asks whether the value in the address3 field of frame 52 is equal to the current value of the BSSID within SRAM 58. If the answer is yes, the method proceeds to step 105. If the answer is no, it means that wireless adapter 36 is not authorized to communicate with the computer 21 that sent the frame 52, and so step 112 is entered, where the current frame 52 is discarded and the next frame 52 is examined.

At step 105, 802.11b module 71 determines the frame 52 length from MAC chip buffer 56. At step 106, 802.11b module 71 asks whether frame 52 is a bridge tunnel type of frame. This information is determined from the 802.11b header within MAC chip buffer 56. If the answer is no, the method goes to step 107. If the answer is yes, the method goes to step 108.

At step 107, 802.11b module 71 asks whether frame 52 is an RFC1042 type. This information is determined from MAC chip buffer 56. If the answer is no, the method proceeds to step 111. If the answer is yes, the method proceeds to step 109.

At step 109, 802.11b module 71 asks whether the type equals 0X8137 or 0X80F3. This information is determined from the MAC chip buffer 56. If the answer is no, the method proceeds to step 111. If the answer is yes, the method proceeds to step 110.

At step 110, 802.11b module 71 sets the type/length field within new frame 51 equal to either 0X8137 or 0X80F3, depending upon the determination of type made in step 109; sets the frame length of new frame 51 equal to the frame length of frame 52 minus 8; and strips the RFC1042 header. Then the method proceeds to step 111.

At step 108, 802.11b module 71 sets the type/length field of new frame 51 equal to an expression which decodes as: "look for the data 36 bytes after the beginning of the frame". 30 of these bytes represent the 802.11b header and 6 of these bytes represent the SNAP header. Also at step 108, 802.11b module 71 sets the frame length of new frame 51 equal to the frame length of frame 52 minus 8; and strips the bridge tunnel header. Then the method proceeds to step 111.

At step 111, the data from frame 52, as wells as the items of new frame 51 that have been built up by module 71 as described previously in conjunction with this FIG. 10, are sent to the Ethernet NIC buffer within Ethernet chip 26. The method then proceeds to step 112, where the next frame 52 is taken up for processing.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A wireless adapter for enabling a portable computer that is configured to communicate with other computers using a wired protocol to communicate with other computers using a wireless protocol, said wireless adapter comprising:

a transceiver; and a converter adapted to couple the transceiver to the portable computer; wherein said portable computer comprises a wired protocol module for enabling the portable computer to communicate using a wired protocol;

the converter comprises a logic device coupled to the transceiver, and a microprocessor coupled to the logic device and to the wired protocol module; and the logic device comprises:

an address decoder coupled to the microprocessor;

a controller state machine coupled to the microprocessor;

a memory subsystem controller coupled to the address decoder and to memory associated with the microprocessor; and an interface controller coupled to the address decoder and to the transceiver section.

* * * * *